Feb. 7, 1933.  G. W. WOODS  1,896,212
CEMENT WELL STRAINER
Filed Oct. 27, 1931
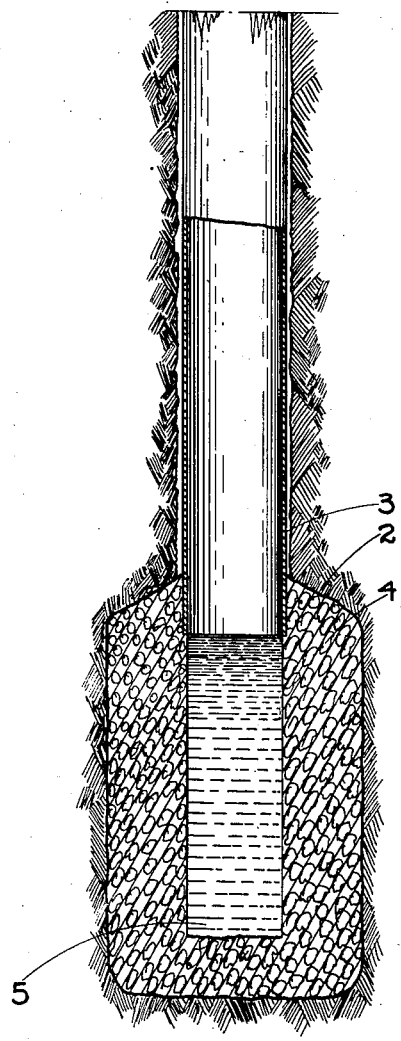
GORHAM W. WOODS INVENTOR
BY Jesse R. Stone
ATTORNEY Patented Feb. 7, 1933

1,896,212

UNITED STATES PATENT OFFICE

GORHAM W. WOODS, OF HOUSTON, TEXAS, ASSIGNOR TO HUGHES TOOL COMPANY, OF HOUSTON, TEXAS, A CORPORATION OF TEXAS

CEMENT WELL STRAINER

Application filed October 27, 1931. Serial No. 571,322

My invention relates to well strainers to be used in filtering the fluid entering the well from the producing formation.

The strainer most commonly employed in deep well operations for oil, gas and the like includes a pipe having perforations or openings in the pipe graduated to the proper size of opening to accommodate the particular material in which the strainer is set.

It is an object of my invention to provide a strainer which may be formed in position in the well and which may be easily modified to suit the state of the formation in which the production occurs and which may be made inexpensively.

It is also an object to provide a well strainer which will not easily become worn or broken.

In the drawing herewith I have shown a vertical sectional view through a strainer embodying my invention shown in position at the bottom of the well.

In producing my particular well strainer, I contemplate drilling the well down into the producing stratum and after the bottom has been reached to employ an underreamer to enlarge the opening as shown at 2 so as to form a cavity about the lower end of the well casing 3 into which the water, gas or the like may be received. After this cavity 2 has been formed by the use of the underreamer, I set the casing 3 with the lower end projecting somewhat into the cavity. I then force cement 4 downwardly through the casing to completely fill the cavity 2 which has been underreamed.

This cement may be discharged into position by any well known manner. I contemplate forcing the same to the bottom by a block or piston moved downwardly by pump pressure. The cement may be ordinary hydraulic cement but I contemplate making the said cement out of the mixture with hydraulic cement of the proper composition, of sand of the desired size to make the cement porous so as to allow the filtering therethrough of fluid. It will be obvious that this cement may be made of the proper proportions of sand and cement and of the suitable coarseness of sand so that it will allow various sizes of openings therethrough depending upon the proportions of the mixture and the size of the sand or crushed rock making up the aggregate employed. This will, of course, vary as to the composition of the material in which the producing stratum is found and may be varied according to the judgement of the driller in each instance.

When this cement has been allowed to set and become fixed within the cavity 2, a drill may be lowered to the bottom of the well and a bore opening shown at 5 may be drilled into the block of cement to a point spaced from the lower end of the cavity. This provides a chamber into which the oil or gas may filter from the formation to the well and said fluid may then be removed in the usual manner.

It will be seen that my form of strainer may be placed in position without difficulty and will form a screen which is strong and not liable to break or fail in use and which will be adaptable for any type of formation in which the well may be drilled.

What I claim as new is:

1. In a well having a casing therein, the method of forming a well strainer on said casing comprising, reaming an enlarged cavity, forcing cement which forms a porous filtering medium upon setting into said cavity, and drilling a fluid receiving recess into said cement as a continuation of said casing.

2. The method of forming a strainer in a deep well comprising enlarging the bore of the well in the producing formation, filling said enlarged portion with cement which forms a porous filtering medium upon setting, and drilling a fluid receiving recess into the said cement as a continuation of the well bore.

In testimony whereof, I hereunto affix my signature this the 21st day of October, A. D., 1931.

GORHAM W. WOODS.